United States Patent
Ono et al.

(10) Patent No.: US 8,509,995 B2
(45) Date of Patent: Aug. 13, 2013

(54) POWER STEERING DEVICE

(75) Inventors: Kimiaki Ono, Susono (JP); Ikuo Kushiro, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/127,938

(22) PCT Filed: Dec. 26, 2008

(86) PCT No.: PCT/JP2008/073725
§ 371 (c)(1),
(2), (4) Date: May 5, 2011

(87) PCT Pub. No.: WO2010/073367
PCT Pub. Date: Jul. 1, 2010

(65) Prior Publication Data
US 2011/0218708 A1    Sep. 8, 2011

(51) Int. Cl.
*B62D 6/00* (2006.01)
*B62D 5/04* (2006.01)

(52) U.S. Cl.
USPC .................................. 701/42; 703/2; 180/404

(58) Field of Classification Search
USPC ............... 701/32.9, 41–44; 703/2; 180/400, 180/404, 428
See application file for complete search history.

(56) References Cited

U.S. PATENT DOCUMENTS

| | | | |
|---|---|---|---|
| 5,027,917 A | 7/1991 | Ohmura | |
| 5,836,416 A | 11/1998 | Muller et al. | |
| 6,445,987 B1 * | 9/2002 | Kurishige et al. | 701/41 |
| 6,450,287 B1 * | 9/2002 | Kurishige et al. | 180/446 |
| 6,792,343 B2 * | 9/2004 | Yasui et al. | 701/71 |
| 6,863,150 B1 * | 3/2005 | Tanaka et al. | 180/446 |
| 6,864,605 B2 * | 3/2005 | Shimizu et al. | 310/68 R |
| 6,895,317 B2 * | 5/2005 | Yasui et al. | 701/36 |
| 7,308,964 B2 * | 12/2007 | Hara et al. | 180/446 |
| 7,604,088 B2 * | 10/2009 | Nishizaki et al. | 180/446 |
| 7,654,167 B2 * | 2/2010 | Watanabe et al. | 74/458 |
| 7,676,309 B2 * | 3/2010 | Tamaki et al. | 701/41 |
| 7,900,742 B2 * | 3/2011 | Kubokawa et al. | 180/402 |

(Continued)

FOREIGN PATENT DOCUMENTS

| | | |
|---|---|---|
| JP | 62 088664 | 4/1987 |
| JP | 03 074275 | 3/1991 |

(Continued)

OTHER PUBLICATIONS

International Search Report issued Feb. 24, 2009 in PCT/JPO8/73725 filed Dec. 26, 2008.

*Primary Examiner* — Russell Frejd

(74) *Attorney, Agent, or Firm* — Oblon, Spivak, McClelland, Maier & Neustadt, L.L.P.

(57) ABSTRACT

A power steering device sets an applied friction torque applied to a steering wheel based on a real steering angle and a target steering angle, and performs a control of applying the applied friction torque to the steering wheel. An applied friction torque changing unit changes the applied friction torque, which is calculated from the real steering angle and the target steering angle, when the vehicle reverses. Concretely, the unit changes the applied friction torque to a smaller value when the vehicle reverses than that when the vehicle advances. Thereby, it is possible to decrease the applied friction torque properly when the vehicle reverses, and it become possible to improve the maneuverability of the steering wheel.

5 Claims, 3 Drawing Sheets

(56) References Cited

U.S. PATENT DOCUMENTS

| | | | | |
|---|---|---|---|---|
| 8,046,131 | B2* | 10/2011 | Tanaka et al. | 701/41 |
| 8,140,222 | B2* | 3/2012 | Watanabe et al. | 701/41 |
| 2010/0045219 | A1* | 2/2010 | Ajima et al. | 318/400.04 |
| 2010/0228440 | A1* | 9/2010 | Yamazaki | 701/41 |
| 2011/0120797 | A1* | 5/2011 | Kitahata et al. | 180/443 |
| 2011/0209939 | A1* | 9/2011 | Ono et al. | 180/447 |
| 2011/0231065 | A1* | 9/2011 | Kushiro et al. | 701/41 |
| 2012/0232759 | A1* | 9/2012 | Oniwa et al. | 701/41 |

FOREIGN PATENT DOCUMENTS

| | | |
|---|---|---|
| JP | 06 144262 | 5/1994 |
| JP | 09 240501 | 9/1997 |
| JP | 2000 190860 | 7/2000 |
| JP | 2001 130433 | 5/2001 |
| JP | 2002 104210 | 4/2002 |
| JP | 2002 193128 | 7/2002 |
| JP | 2006 168650 | 6/2006 |
| JP | 2006 264393 | 10/2006 |

* cited by examiner

POWER STEERING DEVICE

TECHNICAL FIELD

The present invention relates to a power steering device which controls an applied friction torque applied to a steering wheel.

BACKGROUND TECHNIQUE

This kind of technique is proposed in Patent Reference-1, for example. In Patent Reference-1, there is proposed a technique which applies friction torque to a steering wheel in accordance with a steering angle and a vehicle speed, in order to improve a characteristic of returning the steering wheel at low speed and astringency of the steering wheel at high speed.

Patent Reference-1: Japanese Patent Application Laid-open under No. 2002-104210

DISCLOSURE OF INVENTION

Problem to be Solved by the Invention

However, when the friction torque mentioned above is applied to the steering wheel, it happens that the maneuverability of the steering wheel degrades at the time of reversing the vehicle. This is because, at the time of reversing the vehicle, the amounts of turning the steering wheel and returning the steering wheel tend to increase.

The present invention has been achieved in order to solve the above problem. It is an object of this invention to provide a power steering device capable of improving a maneuverability of a steering wheel at the time of reversing the vehicle.

Means for Solving the Problem

According to one aspect of the present invention, there is provided a power steering device which sets an applied friction torque applied to a steering wheel based on a real steering angle and a target steering angle and which executes a control of applying applied friction torque to the steering wheel including: an applied friction torque changing unit which changes the applied friction torque to a smaller value when a vehicle reverses than the applied friction torque applied when the vehicle advances.

The above power steering device is preferably used to set an applied friction torque to be applied to a steering wheel, based on a real steering angle and a target steering angle, and to execute the control of applying the applied friction torque to the steering wheel. The applied friction torque changing unit changes the applied friction torque, which is calculated from the real steering angle and the target steering angle, when the vehicle reverses. Concretely, the applied friction torque changing unit changes the applied friction torque to a smaller value when the vehicle reverses than that when the vehicle advances. Thereby, it is possible to decrease the applied friction torque properly when the vehicle reverses, and it become possible to improve the maneuverability of the steering wheel.

In a manner of the above power steering device, the applied friction torque changing unit sets the applied friction torque to "0" when the vehicle reverses. Namely, it becomes possible for the applied friction torque changing unit to stop the control of applying the applied friction torque when the vehicle reverses.

BRIEF DESCRIPTION OF THE REFERENCE NUMBER

Figure 1:
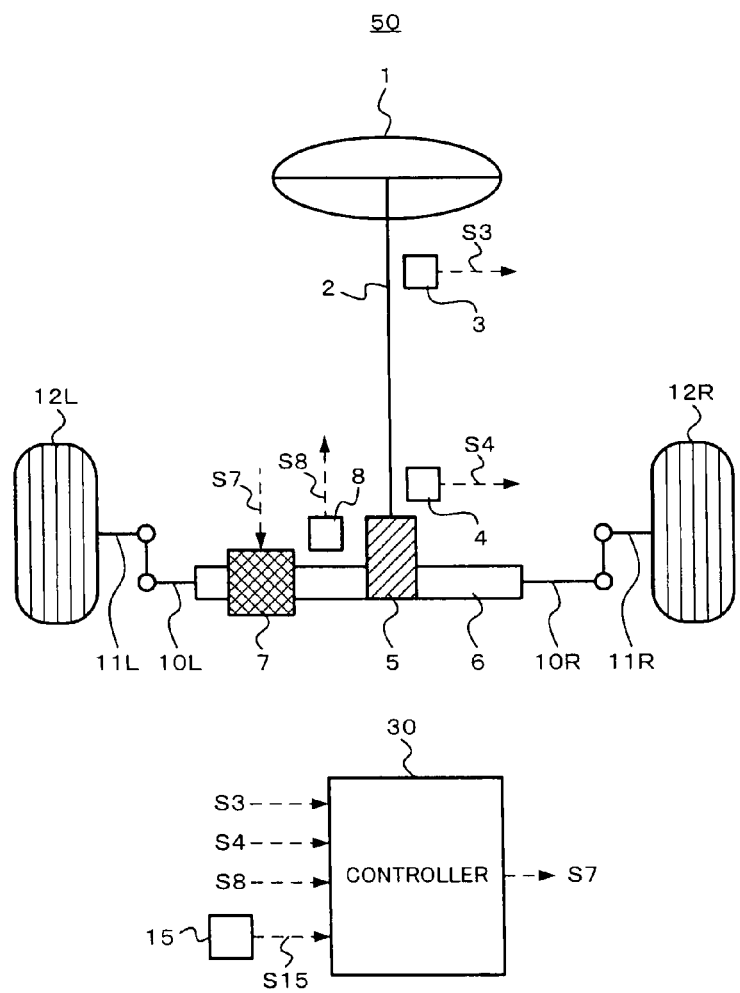
FIG. 1 is a schematic diagram illustrating a configuration of a steering control system to which a power steering device according to an embodiment is applied.

1 Steering wheel
2 Steering shaft
3 Steering angle sensor
4 Steering torque sensor
5 Pinion
6 Steering rack
7 Motor
8 Motor rotation angle sensor
12 Wheels
15 Vehicle speed sensor
30 Controller
50 Steering control system

DETAILED DESCRIPTION OF THE PREFERRED EMBODIMENTS

A preferred embodiment of the present invention will be explained hereinafter with reference to the drawings.

[Device Configuration]

First, a description will be given of an entire configuration of a system (hereinafter referred to as "steering control system") 50 to which a power steering device according to the embodiment is applied. FIG. 1 is a schematic diagram showing a configuration of the steering control system 50.

The steering control system 50 mainly includes a steering wheel 1, a steering shaft 2, a steering angle sensor 3, a steering torque sensor 4, a pinion 5, a steering rack 6, a motor 7, a motor rotation angle sensor 8, tie rods 10R and 10L, knuckle arms 11R and 11L, wheels (front wheels) 12FR and 12FL, a vehicle speed sensor 15, and a controller 30. Hereinafter, when each of the tie rods 10R and 10L, each of the knuckle arms 11R and 11L, and each of the wheels 12FR and 12FL are not distinguished from each other, "R" and "L" at the end of the reference numerals will be omitted.

The steering control system 50 is formed by the electric power steering (EPS: Electric Power Steering) system. Concretely, the steering control system 50 is mounted on a vehicle, and steers the front wheels 12F (steered wheels) in accordance with the operation of the steering wheel 1.

The steering wheel 1 is operated by the driver for turning the vehicle. The steering wheel 1 is connected to the pinion 5 via the steering shaft 2. The steering angle sensor 3 and the steering torque sensor 4 are mainly provided on the steering shaft 2.

The pinion 5 rotates in response to the rotation of the steering shaft 2. The steering rack 6 moves in response to the rotation of the pinion 5. The knuckle arms 11 are connected to the steering rack 6 via the tie rods 10, and the wheels 12F are connected to the knuckle arms 11. In this case, when the tie rods 10 and the knuckle arms 11 are operated by the steering rack 6, the wheels 12F connected to the knuckle arms 11 are steered.

The motor 7 may be a three-phase AC motor, for example. The motor 7 is provided within the steering-gear box (not shown) and is coaxial with the steering rack 6. The motor 7 can apply a force which assists the movement of the steering rack 6 or a force which prevents the movement of the steering rack 6. Concretely, the motor 7 generates the assist torque in the steering direction by the driver in order to improve the steering feeling and the steering stability. In contrast, the motor 7 generates the applied friction torque in a direction opposite to the steering direction by the driver in order to improve the steering keeping performance. In other words, the motor 7 applies a steering reaction force. The motor 7 is controlled by a control signal S7 supplied by the controller 30.

Various kinds of sensors provided within the steering control system 50 function as follows. The steering angle sensor 3 detects the steering angle corresponding to the operation of the steering wheel 1 by the driver, and supplies a detecting signal S3 corresponding to the detected steering angle to the controller 30. The steering torque sensor 4 detects the steering torque generated by the operation by the driver, and supplies the controller 30 with a detecting signal S4 corresponding to the detected steering torque. The motor rotation angle sensor 8 detects the rotation angle of the motor 7, and supplies the controller 30 with a detecting signal S8 corresponding to the detected rotation angle. The vehicle speed sensor 15 detects the vehicle speed (for example, by detecting the wheel speed), and supplies the controller 30 with a detecting signal S15 corresponding to the detected vehicle speed.

The controller 30 includes a CPU, a ROM, a RAM, and an A/D converter, which are not shown. The controller 30 executes the control of the motor 7 by supplying the motor 7 with the control signal S7 based on the detecting signals S3, S4, S8 and S15, supplied from the above-mentioned various kinds of sensors. In this embodiment, the controller 30 executes the control of making the motor 7 apply the applied friction torque to the steering wheel 1 (hereinafter, the control is referred to as "friction applying control"). In this way, the controller 30 functions as the power steering device in the present invention. The controller 30 may be realized by the ECU (Electronic Control Unit), which controls the vehicle.

[Example of Friction Applying Control]

Now, a description will be given of an example of the friction applying control performed by the controller 30. First, the controller 30 calculates the friction torque (hereinafter expressed by "$T_t$") applied to the steering wheel 1 based on the steering angle (hereinafter expressed by "$\theta$") and the vehicle speed (hereinafter expressed by "V"). Next, the controller 30 calculates the target steering angle (hereinafter expressed by "$\theta_t$") based on the steering angle $\theta$ and the friction torque $T_t$. Then, the controller 30 calculates the applied friction torque (hereinafter expressed by "$T_c$") based on the deviation (hereinafter expressed by "$\Delta\theta$") between the target steering angle $\theta_t$ and the steering angle $\theta$. In other words, the controller 30 corrects the friction torque $T_t$ based on the target steering angle $\theta_t$, and sets the corrected friction torque to the applied friction torque $T_c$. Then, the controller 30 executes the control of the motor 7 such that the above applied friction torque $T_c$ is applied to the steering wheel 1.

Now, a concrete description will be given of the friction applying control, with reference to FIG. 2 and to FIGS. 4A and 4B.

Figure 2:
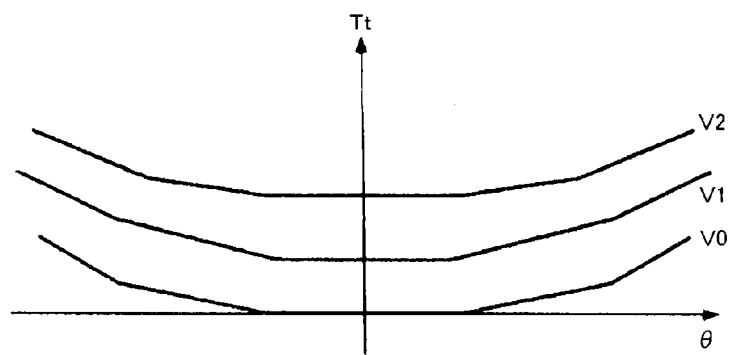
FIG. 2 is a diagram illustrating an example of a method for calculating friction torque.

FIG. 2 shows an example of a method for calculating the friction torque $T_t$. In FIG. 2, a horizontal axis shows the steering angle $\theta$, and a vertical axis shows the friction torque $T_t$. More concretely, FIG. 2 corresponds to maps defining the friction torque $T_t$ to be set with respect to the steering angle $\theta$. Here, as an example, FIG. 2 shows the maps which corresponds to a high speed range V2, a middle speed range V1 and a low speed range V0, respectively. The controller 30 calculates the friction torque $T_t$ corresponding to the present steering angle $\theta$ and the vehicle speed V by referring to the maps mentioned above.

According to the maps shown in FIG. 2, if the steering angle $\theta$ is constant, the greater the vehicle speed is, the greater the friction torque $T_t$ set becomes. The reason is as follows. In the high speed range V2 or the middle speed range V1, it is desirable to generate a relatively-large friction torque in terms of the improvement of stability in traveling straightforward as well as the reduction of the power and the improvement of stability in maintaining the steering angle. On the contrary, in the low speed range V0, the increased friction torque $T_t$ tends to bring a strange feeling to the driver and thus degrades the steering feeling. Further, according to the maps shown in FIG. 2, if the vehicle speed is constant or in the same vehicle-speed range, the greater the steering angle $\theta$ is, the greater the set friction torque $T_t$ becomes. This is because a large lateral load tends to be generated due to the increased steered angle of the wheel when the magnitude of the steering angle e is large, and thus a large friction torque is required in terms of the reduction of the power required to maintain the steering angle and the improvement of stability in maintaining the steering angle.

Next, a description will be given of a method for calculating the target steering angle $\theta_t$ based on the friction torque $T_t$ calculated as described above. The controller 30 calculates the target steering angle $\theta_t$ based on the deviation $\Delta\theta$ (=$\theta_t-\theta$) between the target steering angle $\theta_t$ and the steering angle $\theta$, and the upper limit value of the deviation $\Delta$ (=$T_t/K$) defined by the friction torque $T_t$ and a gain K. Concretely, the controller 30 initializes the target steering angle $\theta_t$ to the steering angle $\theta$ at first (does not initialize if the target steering angle $\theta_t$ has already been initialized). Then, the controller 30 calculates the deviation $\Delta\theta$ (=$\theta_t-\theta$). Thereafter, if the controller 30 determines "$\Delta\theta>\Delta$", the controller 30 changes the target steering angle $\theta_t$ to "$\theta_t=\theta+\Delta$". If the controller 30 determines "$\Delta\theta<-\Delta$", the controller 30 changes the target steering angle $\theta_t$ to "$\theta_t=\theta-\Delta$". If the controller 30 determines "$-\Delta\leq\Delta\theta\leq\Delta$", the controller 30 does not change the target steering angle $\theta_t$. Here, the gain K is a value determined in consideration of rigidity of the steering system, for example.

Next, a description will be given of a method for calculating the applied friction torque $T_c$ based on the target steering angle $\theta_t$ calculated as described above. The controller 30 calculates the applied friction torque $T_c$ based on the deviation $\Delta\theta$ (=$\theta t-\theta$) obtained by the target steering angle $\theta_t$ and the gain K(=$T_t/\Delta$). Concretely, the controller 30 calculates the applied friction torque $T_c$ by the following formula: "$T_c=K\cdot\Delta\theta$", namely "$T_c=K(\theta_t-\theta)$".

Figure 3:
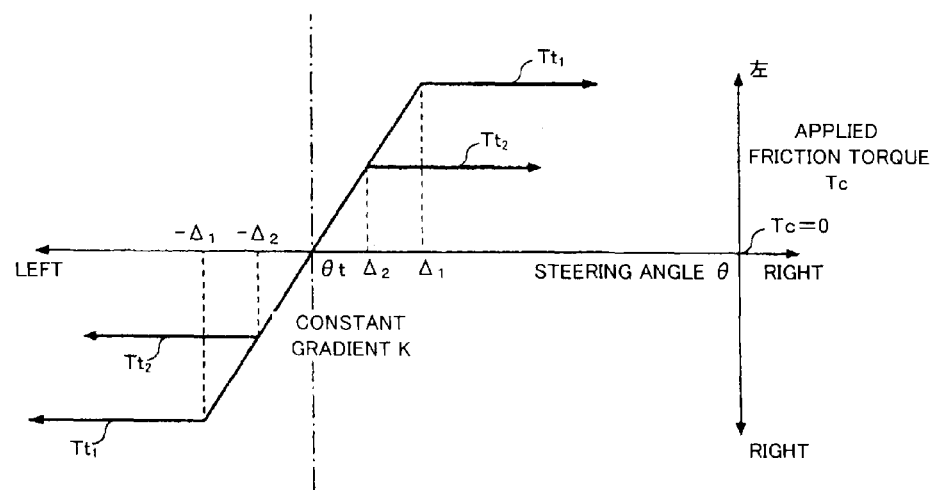
FIG. 3 is a diagram illustrating an example of a characteristic of applied friction torque.

FIG. 3 is a diagram illustrating an example of characteristics of the applied friction torque $T_c$. In FIG. 3, the horizontal axis shows the steering angle $\theta$, and the vertical axis shows the applied friction torque $T_c$ (the torque of the left turn direction is defined as a positive torque, and the torque of the right turn direction is defined as a negative torque). Here, there are shown a case where the friction torque $T_t$ is "$T_{t1}$" and a case where the friction torque $T_t$ is "$T_{t2}$" ($T_{t2}<T_{t1}$), as examples. For example, FIG. 3 shows the friction torque "$T_{t1}$" when the vehicle speed is in the high speed range V2 or middle speed range V1, and the friction torque "$T_{t2}$" when the vehicle speed is in the low speed range V0 (See. FIG. 2).

Further, in FIG. 3, in either case of "$T_{t1}$" and "$T_{t2}$", for better understanding and for the sake of convenience, it is assumed that the target steering angle $\theta_t$ is constant and is not changed by the change of the steering angle $\theta$. It is noted that if the target steering angle $\theta_t$ changes, then the graph is merely translated along the horizontal axis according to a new target steering angle $\theta_t$.

As shown in FIG. 3, since the upper limit value of the deviation $\Delta$ has the relationship "$\Delta=T_t/K$", the greater the friction torque $T_t$ is, the greater the upper limit value of the deviation $\Delta$ becomes (for example, the upper limit value of the deviation $\Delta_1$ in the case of "$T_{t1}$" is larger than the upper limit value of the deviation $\Delta_2$ in the case of "$T_{t2}$". Further, in the range of "$-\Delta \leq \Delta\theta \leq \Delta$", the target steering angle $\theta_t$ is kept unchanged, and the magnitude of the applied friction torque $T_c$ increases in proportion to $\Delta\theta$ because of the relationship "$T_c=K\cdot\Delta\theta$", i.e., "$T_c=K(\theta_t-\theta)$". In the range of "$\Delta\theta>\Delta$" and "$\Delta\theta<-\Delta$", the target steering angle $\theta_t$ is changed as mentioned above and the magnitude of $\Delta\theta$ becomes constant. Thus, because of the relationship "$T_c=K\cdot\Delta\theta$", i.e., "$T_c=K(\theta_t-\theta)$", the magnitude of the applied friction torque $T_c$ becomes a constant value according to the friction torque $T_t$. In this case, in the range of "$-\Delta \leq \Delta\theta \leq \Delta$", the friction torque $T_t$ to be applied to the steering wheel 1 is not actually applied to the steering wheel 1. The magnitude of the applied friction torque $T_c$ is set to the magnitude of the friction torque $T_t$ to be applied to the steering wheel 1 only when an absolute value of $\Delta\theta$ becomes equal to or larger than the upper limit value of the deviation $\Delta$. In the range of "$-\Delta \leq \Delta\theta \leq \Delta$", the friction torque $T_t$ is not applied to the steering wheel 1 so that the sensitive vibration of the friction torque and the degradation of the steering feeling can be suppressed.

Figure 4A:
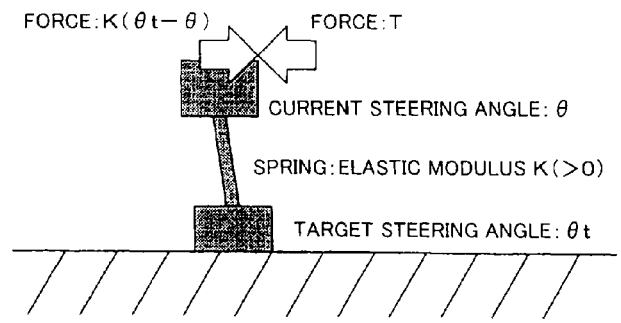
FIGS. 4A and 4B are image diagrams of a model for visualizing the characteristics of the applied friction torque.
Figure 4B:
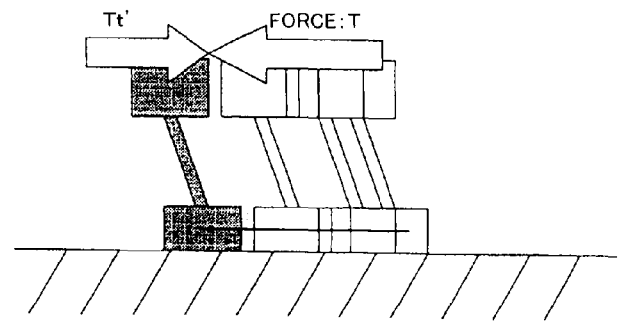

FIGS. 4A and 4B show image diagrams of a model for visualizing the characteristics of the applied friction torque $T_c$. FIG. 4A is an image diagram corresponding to the range of "$-\Delta \leq \Delta\theta \leq \Delta$". In this case, the target steering angle $\theta_t$ does not change, and a force which is balanced with a force T (for example, an external force generated due to an input to the vehicle wheel), i.e., an elastic force ($=K\cdot\Delta\theta$) when a spring having an elastic modulus K ($=$gain K) deforms by the amount of deformation ($\theta_t-\theta$), is generated. FIG. 4B is an image diagram corresponding to the range of "$\Delta\theta \leq \Delta$" and "$\Delta\theta<-\Delta$". In this case, the target steering angle $\theta_t$ changes in a direction where the force T is applied to the target steering angle $\theta_t$, and a constant friction force $T_t'$ (which is smaller than the force T) is generated in an opposite direction of the force T. Here, the friction force $T_t'$ corresponds to a value obtained by converting the friction torque $T_t$ to a force dimension.

[Control Method in the Embodiment]

Next, a description will be given of a control method performed by the controller 30 in the embodiment. According to the embodiment, the controller 30 changes the applied friction torque determined by the method described above when the vehicle reverses. Concretely, when the vehicle reverses, the controller 30 changes the applied friction torque to a smaller value than that when the vehicle advances, and then the controller 30 executes the friction applying control. This is to improve the maneuverability of the steering wheel 1 at the time of reversing the vehicle, at which the amounts of turning the steering wheel 1 and returning the steering wheel 1 increase (i.e., a large amount of the steering adjustment is carried out).

Concretely, the controller 30 obtains a shift position on the transmission and determines whether the vehicle advances or reverses based on the shift position. For example, when the shift position is "D range", the controller 30 determines that the vehicle advances. When the shift position is "R range", the controller 30 determines that the vehicle reverses. Then, when the vehicle advances, the controller 30 performs the friction applying control in a normal way. In other words, the controller 30 executes a control which applies the applied friction torque without changing the applied friction torque determined by the method mentioned above. On the other hand, when the vehicle reverses, the controller 30 performs the friction applying control after changing the applied friction torque determined by the method mentioned above to a small value.

In one example, the controller 30 may execute a control which decreases the applied friction torque to a predetermined friction torque (for example, the torque in accordance with a driving condition, or the torque determined by adaptation for each vehicle) when the vehicle reverses. In another example, the controller 30 may decrease the applied friction torque to "0" when the vehicle reverses. Namely, the controller 30 may stop the friction applying control when the vehicle reverses. It is noted that the controller 30 promptly performs this kind of process which changes the applied friction torque at the time when the vehicle begins to reverse.

Figure 5:
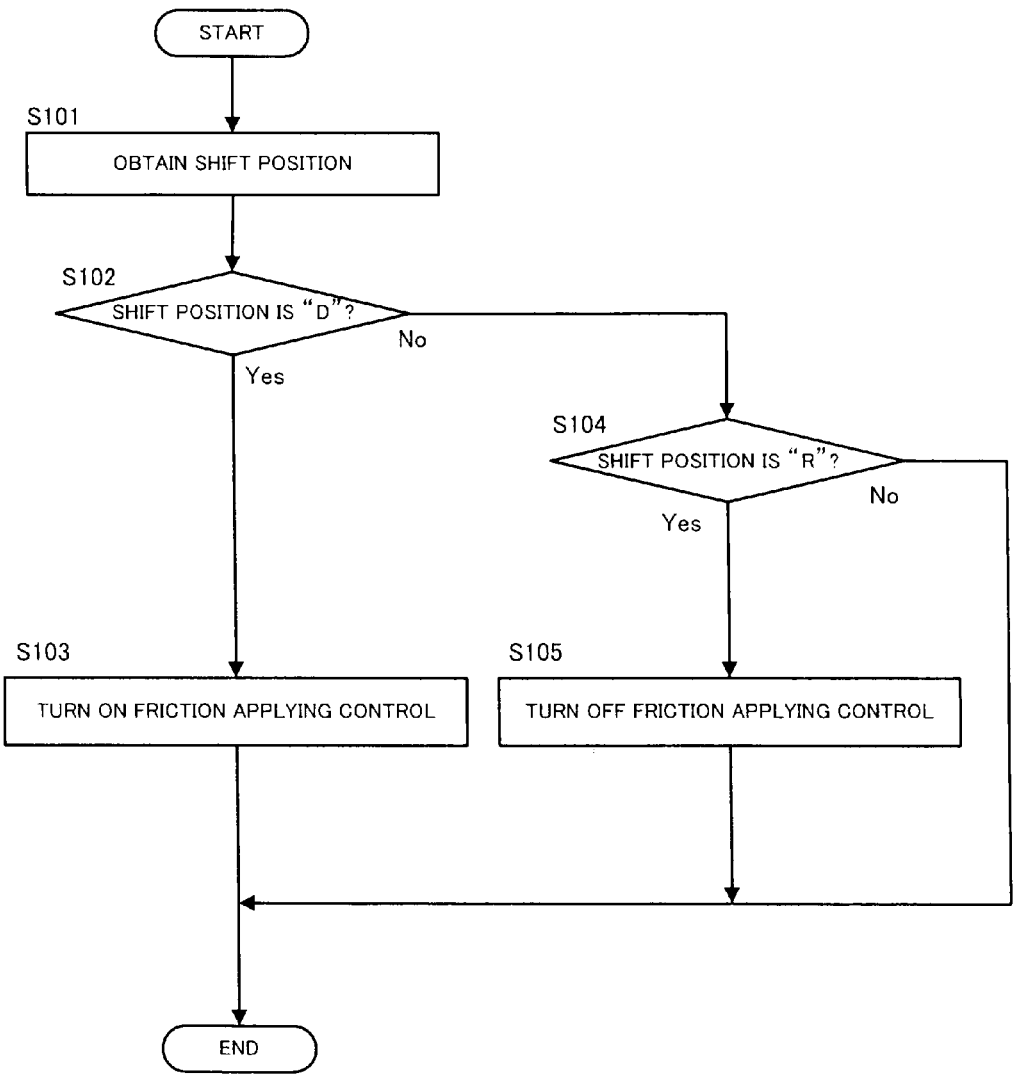
FIG. 5 is a flow chart of a control process according to the embodiment.

FIG. 5 is a flow chart of a control process according to this embodiment. The control process stops the friction applying control when the vehicle reverses. This process is repeatedly executed by the controller 30 in a predetermined cycle.

First, at step S101, the controller 30 obtains the shift position on the transmission. Then, the process goes to step S102. At step S102, the controller 30 determines whether or not the shift position is "D range".

When the shift position is "D range" (step S102; Yes), the process goes to step S103. In this case, since the vehicle is advancing, the controller 30 turns on the friction applying control (step S103). Namely, the controller 30 performs the normal friction applying control, which applies the applied friction torque without changing the applied friction torque determined by the method mentioned above. Then, the process ends.

Meanwhile, when the shift position is not "D range" (step S102; No), the process goes to step S104. At step S104, the controller 30 determines whether or not the shift position is "R range".

When the shift position is "R range" (step S104; Yes), the process goes to step S105. In this case, since the vehicle reverses, the controller 30 turns off the friction applying control (step S105). Namely, the controller 30 sets the applied friction torque to "0". Then, the process goes out of the flow. Meanwhile, when the shift position is not "R range" (step S104; No), the process ends. This is because the vehicle does not advance nor reverse in this case.

According to the above-mentioned embodiment, it is possible to decrease the applied friction torque properly when the vehicle reverses, and it becomes possible to improve the maneuverability of the steering wheel 1.

INDUSTRIAL APPLICABILITY

This invention can be used for a vehicle including a power steering device which can apply torque to a steering wheel.

The invention claimed is:

1. A power steering device mounted on a vehicle, comprising:
    a friction torque setting unit which sets a friction torque applied to a steering wheel based on operating condition of the vehicle;
    a target steering angle setting unit which sets a target steering angle based on the friction torque;

a torque applying unit which sets an applied friction torque based on a deviation between the target steering angle and a steering angle, and which performs a control of applying the applied friction torque to the steering wheel; and an applied friction torque changing unit which changes the applied friction torque, when a vehicle reverses, to a value smaller than the applied friction torque applied when the vehicle advances.

2. The power steering device according to claim 1, wherein the applied friction torque changing unit sets the applied friction torque to "0" when the vehicle reverses.

3. The power steering device according to claim 1, wherein the operating condition includes the steering angle and a speed of the vehicle.

4. The power steering device according to claim 1, wherein the torque applying unit sets the applied friction torque according to the formula:

$$T_c = K\Delta\theta \text{ where } \Delta\theta = \theta_t - \theta,$$

wherein:

$T_c$ is an applied friction torque;
$K$ is a gain;
$\theta_t$ is a target steering angle;
$\theta$ is a steering angle; and
$\Delta\theta$ is a deviation between the target steering angle and the steering angle.

5. The power steering device according to claim 4, wherein when an absolute value of the deviation is equal to or less than an upper limit value of the deviation, the friction torque is not applied to the steering wheel.

* * * * *